United States Patent
Kay et al.

(10) Patent No.: US 9,535,755 B2
(45) Date of Patent: Jan. 3, 2017

(54) TIERS OF DATA STORAGE FOR WEB APPLICATIONS AND BROWSER EXTENSIONS

(75) Inventors: Erik Kay, Belmont, CA (US); Mihai Parparita, Mountain View, CA (US); Benjamin Kalman, Chatswood (AU); Ben Olmstead, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 270 days.

(21) Appl. No.: 13/416,377

(22) Filed: Mar. 9, 2012

(65) Prior Publication Data
US 2013/0238742 A1    Sep. 12, 2013

(51) Int. Cl.
*G06F 9/50* (2006.01)
*H04L 29/08* (2006.01)

(52) U.S. Cl.
CPC ............. *G06F 9/5016* (2013.01); *H04L 67/10* (2013.01); *H04L 67/1095* (2013.01)

(58) Field of Classification Search
CPC ...... G06F 9/44; G06F 17/30; G06F 17/30861; H04L 67/10; H04L 67/1095
USPC ................................. 709/203, 217, 223, 224
See application file for complete search history.

(56) References Cited

U.S. PATENT DOCUMENTS

| | | | |
|---|---|---|---|
| 6,839,803 B1 * | 1/2005 | Loh ....................... | G03D 15/005 711/113 |
| 7,032,033 B1 * | 4/2006 | Ledoux ............. | G06F 17/30575 707/999.202 |
| 7,130,872 B2 * | 10/2006 | de Bonet .......... | G06F 17/30902 |
| 7,404,011 B2 * | 7/2008 | Hansmann ........ | G06F 17/30569 707/999.102 |
| 7,814,277 B2 * | 10/2010 | Henshaw ............ | G06F 12/0866 711/118 |
| 8,112,537 B2 * | 2/2012 | Guenther ............ | H04L 67/1095 709/203 |

(Continued)

FOREIGN PATENT DOCUMENTS

WO    2013133916 A1    9/2013

OTHER PUBLICATIONS

"Create a New Google Account", Google, retrieved on Apr. 19, 2013 from http://web.archive.org/web/20120302072020/https://accounts.google.com/SignUp, Mar. 2, 2012, 3 pages.

(Continued)

*Primary Examiner* — Lashonda Jacobs
(74) *Attorney, Agent, or Firm* — Brake Hughes Bellermann LLP

(57) ABSTRACT

Access is provided to a first tier of limited persistent storage at a server. A first set of data from the first tier is synchronized across devices associated with a user account. Access is provided to a second tier of persistent storage on a local, tangible non-volatile storage medium, and to a third tier of temporary storage on a local, tangible volatile storage medium. A web browser receives a storage request from a web application or browser extension. The request includes a type of a tier of data storage associated with a feature of the web application or browser extension. The type includes at least one of the first tier of remote limited persistent storage, the second tier of local persistent storage, or the third tier of local temporary storage. At least one feature of the web application or browser extension is associated with the tier of data storage.

23 Claims, 5 Drawing Sheets

(56) References Cited

U.S. PATENT DOCUMENTS

| | | | | |
|---|---|---|---|---|
| 8,190,703 | B2* | 5/2012 | Lin | G06F 17/30893 709/205 |
| 8,229,897 | B2* | 7/2012 | Cannon | G06F 11/1469 707/644 |
| 8,407,257 | B2* | 3/2013 | Nama | G06F 17/30607 707/792 |
| 8,621,091 | B1* | 12/2013 | Akalin | G06F 17/30902 709/220 |
| 8,745,167 | B2* | 6/2014 | Mendez | G06Q 10/10 709/203 |
| 8,954,381 | B1* | 2/2015 | Naamad | G06F 3/0685 707/609 |
| 9,430,368 | B1* | 8/2016 | Derbeko | G06F 12/02 |
| 2006/0026006 | A1* | 2/2006 | Hindle | G06F 17/30581 705/1.1 |
| 2007/0033569 | A1* | 2/2007 | Davidson | G06F 17/30902 717/103 |
| 2007/0174490 | A1* | 7/2007 | Choi | G06F 8/70 709/246 |
| 2010/0095311 | A1* | 4/2010 | Collins | G06F 9/541 719/328 |
| 2012/0185647 | A1* | 7/2012 | Dawkins | G06F 3/0605 711/114 |
| 2013/0132674 | A1* | 5/2013 | Sundrani | G06F 12/0804 711/122 |
| 2013/0145095 | A1* | 6/2013 | McKean | G06F 17/3048 711/122 |

OTHER PUBLICATIONS

Benoit de Boursetty, "Using Gmail, Calendar and Docs without an Internet connection", Official Gmail Blog, retrieved on Apr. 13, 2013 from http://gmailblog.blogspot.nl/2011/08/using-gmail-calendar-and-docs-without.html, Aug. 31, 2011, 2 pages.

Susan Cline, "The difference between Gmail, a Google Account, an Apps Account, and an Apps for Business Account", TechRepublic, retrieved on Apr. 19, 2013 from http://www.techrepublic.com/blog/google-in-the-enterprise/ the-difference-between-gmail-a-google-account-an-apps-account-and-an-apps-for-business-account/119, Jun. 15, 2011, 2 pages.

Emily Wood, "Updates to Google Docs app for Android: Offline access and improved tablet experience", Google Drive Blog, retrieved on Apr. 13, 2013 from http://googledrive.blogspot.nl/2012/02/updates-to-google-docs-app-for-android.html, Feb. 1, 2012, 4 pages.

Search Report and Written Opinion for International Application No. PCT/US2013/023795, mailed May 21, 2013, 12 pages.

International Preliminary Report on Patentability for PCT Patent Application No. PCT/US2013/023795, mailed on Sep. 18, 2014, 9 pages.

* cited by examiner

TIERS OF DATA STORAGE FOR WEB APPLICATIONS AND BROWSER EXTENSIONS

TECHNICAL FIELD

This disclosure generally relates to allocating storage for software applications, and more particularly to allocating tiers of data storage for web application and browser extensions.

BACKGROUND

Different levels of data storage provide different benefits. Data can be stored locally or remotely, and can be stored in a temporary storage medium (such as a cache) or in a more persistent storage medium (such as non-volatile memory). A cache stores data so that future requests for that data can be served faster. Data stored within a cache might include values that have been computed earlier or duplicates of original values that are stored elsewhere. If requested data is contained in the cache, a request can be served by simply reading the cache, which is faster than having the data recomputed or fetched from its original storage location. To be cost efficient and to enable an efficient use of data, however, caches are relatively small.

Storing data in a persistent location provides various benefits as well. For example, non-volatile memory may retain information even when a computer is not powered. Additionally, a single user may access the same data stored in a remote persistent location when using different computing devices. Multiple users may also have access to the same data stored in a remote persistent location.

Web applications and browser extensions may access and store different types of data. By using web application programming interface(s) (APIs), web applications or browser extensions may store data in a computing device's local disk so that the data is cached locally. A local cache may serve data faster than if the data is stored at a remote server, but updates or data from a web application would not necessarily be reflected if the user upgrades an operating system, or if the user changes to another computer or mobile device. Accordingly, different levels of storage for data used by web applications and browser extensions would allow developers to optimize features of the web applications and browser extensions, and would provide many benefits to users.

SUMMARY

According to one general aspect, a method for providing data storage for features of web applications and browser extensions executes on one or more processors operably coupled to one or more memory devices. Access is provided to a first tier of limited persistent storage at a remote server, wherein a first set of data from the first tier is synchronized across multiple devices associated with a user account. Access is provided to a second tier of persistent storage on a local, tangible non-volatile storage medium. Access is provided to a third tier of temporary storage on a local, tangible volatile storage medium. A storage request is received from a web application or browser extension, the storage request including a type of at least one tier of data storage associated with at least one feature of the web application or browser extension, the type including at least one of the first tier of remote limited persistent storage, the second tier of local persistent storage, or the third tier of local temporary storage. The at least one feature of the web application or browser extension is associated with the at least one tier of data storage.

According to another general aspect, a method for allocating data for features of web applications executes on one or more processors operably coupled to one or more memory devices of a computing device. A feature of a web application executes on the computing device. At least one tier of a set of specified tiers of data storage is automatically determined based on the feature. A storage request for a set of data associated with the feature is sent to the at least one tier of a set of specified tiers of data storage, the set of specified tiers of data storage including: a first tier of limited persistent storage at a remote server, wherein a first set of data from the first tier is synchronized across multiple devices associated with a user account, a second tier of persistent storage on local non-volatile storage on the computing device, and a third tier of temporary storage of local volatile storage on the computing device.

According to another general aspect, a tangible computer-readable storage medium has recorded and stored thereon instructions that, when executed by one or more processors of a computer system cause the computer system to implement a feature of a web application on the computing system, the web application associated with a user account, the feature associated with at least one tier of a set of specified tiers of data storage. The computer system may send a storage request for set of data related to the feature to the at least one tier of the set of specified tiers of data storage, the set of specified tiers of data storage including: a first tier of limited persistent storage at a remote server, wherein a first set of data from the first tier is synchronized across multiple devices associated with the user account, a second tier of persistent storage on local non-volatile storage on the computing system, and a third tier of temporary storage of local volatile storage on the computing system.

According to yet another general aspect, a system to provide data storage for features of web applications includes a remote a server including a first tier of limited persistent storage, wherein a first set of data from the first tier is synchronized across multiple devices associated with a user account. The system includes a client device including a memory configured to store executable code, the memory including a second tier of persistent storage on local non-volatile storage and a third tier of temporary storage on local volatile storage. The client device also includes a processor operably coupled to the memory, the processor being configured to execute code such that the client device receives a storage request from a web application associated with a user account, the storage request including a type of at least one tier of data storage related to at least one feature of the web application, the type including at least one of the first tier of remote limited persistent storage, the second tier of local persistent storage, or the third tier of local temporary storage. The client device associates the at least one feature of the web application or browser extension with the at least one tier of data storage.

Implementations can include various features. For example, the first tier of limited persistent storage at the remote server may include a portion of data associated with the user account. As another example, the data associated with the user account includes bookmarks, preferences, passwords, and themes. Further, the first set of data may be synchronized across multiple devices based on a request from a first computing device implementing a first web application. In some implementations, the feature implements a location detection sensor of a computing device, and the type includes the second tier. The feature may be associated with an email account associated with the user account, and the type may include the first tier. The feature may relate to a calendar associated with the user account, and the type may include the first tier. In some examples, the tier may be specified by a developer of the web application. Further, the web application may be implemented on a second computing device associated with the user account, and the first set of data may be accessed using the user account.

The details of one or more implementations are set forth in the accompanying drawings and the description below. Other features will be apparent from the description and drawings, and from the claims.

BRIEF DESCRIPTION OF THE DRAWINGS

Like reference symbols in the various drawings indicate like elements.

DETAILED DESCRIPTION

Figure 1:
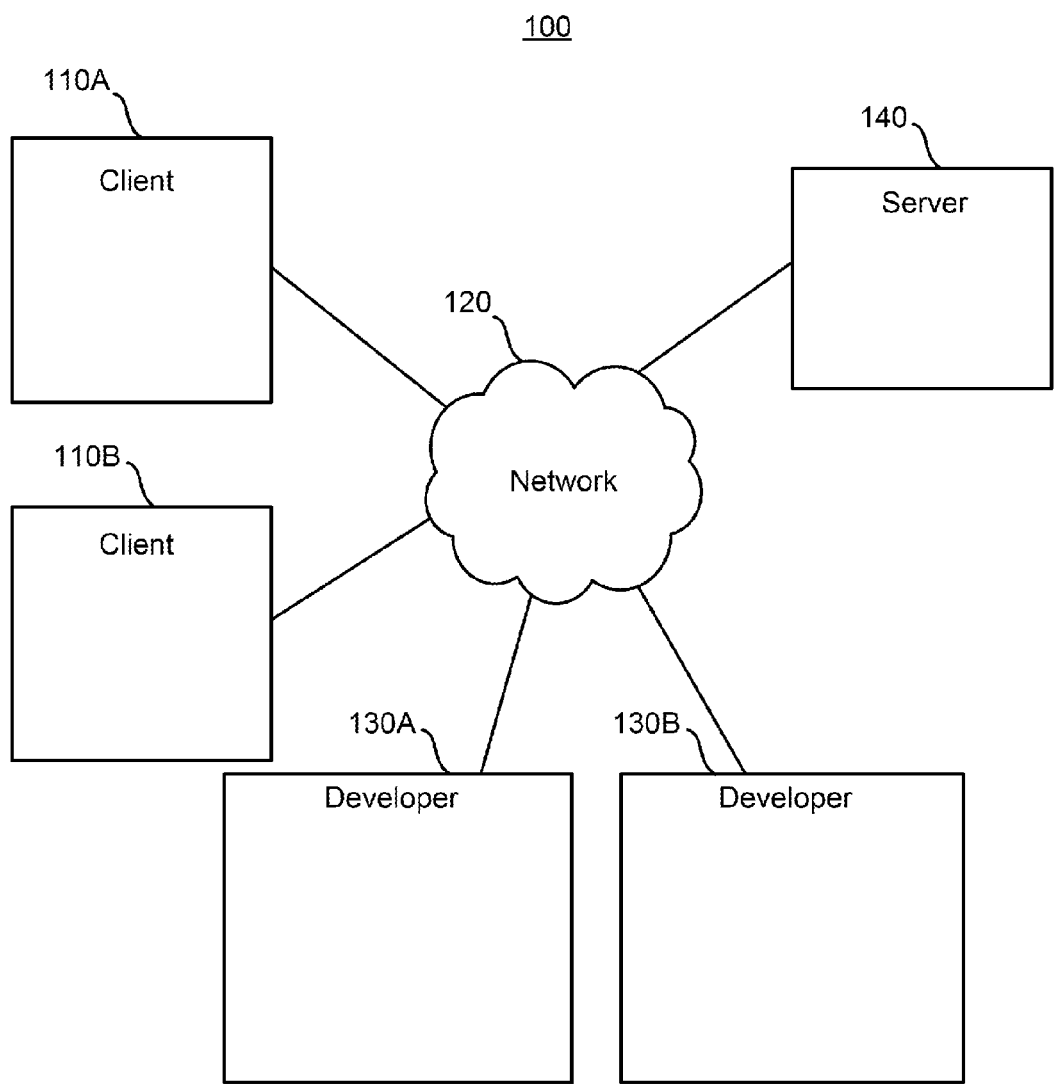
FIG. 1 is a block diagram of a system that can be used to provide data storage for web applications and browser extensions.

A web browser executed by a client device can receive code (e.g., HTML code) from a remote server (e.g., a remote server that hosts a website) and can execute the receive code on the client device for the benefit of a user of the client device.

In various embodiments, the web browser may include or be associated with one or more web applications. In this context, a "web application" may be configured to a single task or multiple tasks for a user. In such an embodiment, the web application may be configured to be executed or interpreted by the web browser. This is compared with the native applications that include machine executable code and are configured to be executed directly by a processor or via the operating system of the client device, whereas, a web application may be incapable of execution or display without the aid of the web browser. Thus, web applications can be run inside a browser with a dedicated user interface, and typically provide functionality and an experience that is more rich and interactive than a standalone website but are less cumbersome and monolithic than a desktop application. Examples of web applications include games, photo editors, and video players that are run inside the browser.

Web applications can be "hosted applications" or "packaged applications." Hosted applications may include at least a portion of a web site that itself includes web pages, plus some metadata that may be especially pertinent to the web application or to the user of the web application to allow the web application to perform some particular functionality for the user. Packaged applications can be thought of as web applications whose code is bundled, so that the user can download all of the content of the web application for execution by the browser. A packaged web application may not need to have network access to perform its functionality for the user, and rather may be executed successfully by the browser locally on the computing device without access to a network. Packaged web applications have the option of using Extension APIs, allowing packaged applications to change the way the browser behaves or looks.

In various embodiments, the web browser may include or be configured to interact with one or more browser extensions. In this context, a "browser extension" may include one or more web pages packaged or grouped together as a definable whole, and configured to extend the functionality to the web browser. Thus, extensions also provide extra functionality to a browser, but generally, unlike web applications, there is little or no user interface component to the functionality provided by a browser extension. Instead, browser extensions extend the functionality of the browser and the websites being viewed in it. For example, browser extensions can extend the functionality of the browser by adding a new button to the address bar, such as an ever-present currency converter. Buttons like this can also apply to the current website being viewed—for example, clicking the currency converter button can convert all prices on the website presented to a user into a currency chosen by the user. In another example, an extension can be installed so that when a user hovers a cursor over a thumbnail image on a webpage executed by a browser a larger-size version of the image is displayed until the user moves the cursor away from the image. In another example, an extension may be installed to embed a "mail this" button next to every link in every page. Compared to web applications, extensions cut across websites and web applications. Extensions may be in effect across all websites (though some are site-specific). Web applications may not combine with other applications in this way. Rather, web applications generally run standalone, like any regular website.

A user account allows a user to authenticate to system services (e.g., web applications) and receive authorization to access them. To log in to a user account, a user may authenticate herself with a password or other credentials for the purposes of accounting, security, and resource management, for example. A system may reconcile and validate the proper ownership of user accounts, and can permanently link ownership of those user accounts to particular individuals by assigning a unique identifier to validated account login identifiers (e.g., user names and passwords, secure identifiers, etc.). The system may validate that individuals only have account login identifiers for the appropriate systems and applications, for example according to an organization's business policies, access control policies, and various application requirements.

A user may save bookmarks, extensions, web applications, themes, and browser preferences to a user account so that they are available no matter what computer the individual is using. That way, the user can have the same web experience everywhere. Settings may be saved in a user's account, and when the user signs into the user account from another computer, changes may be synced instantaneously to the other computer.

Any information that is provided by a user or synced to another computer (e.g., settings, web applications, browser extensions, personal data, etc.) may be provided on an opt-in basis. In other words, such information may be provided from or to a server or a computing device only if users specifically authorize the transmission of such information.

In addition, data may be anonymized in one or more ways before it is sent, so that personally identifiable information is removed.

FIG. 1 is a block diagram of a system that can be used to provide data storage for web applications and browser extensions. System 100 may include clients 110A and 110B, developers 130A and 130B, and server 140, which are interconnected through a network 120.

Clients 110A and 110B may be a computer or a similar device that may execute a web browser, download and execute software applications, and communicate with server 140. Network 120 may be a single network or a combination of any type of computer network, such as a Local Area Network (LAN) or a Wide Area Network (WAN). In addition, network 120 may be a combination of public (e.g., Internet) and private networks. Developers 130A and 130B are client computers accessed by software developers of an application, web application, browser extension, etc. Server 140 is a computer or a similar device that communicates with clients 110A and 110B and developers 130A and 130B.

In the arrangement shown in FIG. 1, a web browser may be used to request installation of web applications and browser extensions by interacting with the server 140. For instance, sync server 140 or another server may implement a website (e.g., an e-commerce site) that is used to distribute web applications, among other content. The server may acquire web applications and browser extensions from developers 130A and 130B, for example.

Requests to install web applications may be included in messages from the computing devices 110A and 110B to the server 140 that indicate agreement to purchase respective web applications. In other implementations, the server 140 may take other forms or implement other techniques, such as providing access to free web applications, or may take the form of a developer's website which provides access to web application installation procedures/packages.

The specific actions performed when installing a web application may vary depending on the particular implementation and/or the particular web application. In an example implementation, installing a web application may include installing an icon that corresponds with the web application in an application launcher area of a web browser application. A user may then interact with this icon to launch the web application. In another example implementation, installing a web application may include syncing the web application across multiple computing devices (e.g., mobile phones, smart phones, tablets, laptops, desktops) that a user accesses, for example from different locations at different times (e.g., using the same login credentials).

In other implementations, installing a web application may include starting a background page for the web application, if the web application includes a background page feature. A background page of a web application may enable the web application to run as soon as the user logs into their computer, including before the user launches a web browser application or launches the associated web application in the web browser application. A background page may an invisible element running in a browser application, where the background page includes a declared association, in the web browser application, with the installed web application.

It will be appreciated that any number of additional servers, client computing devices, or developers of web applications and browser extensions may be included in system 100.

Figure 2:
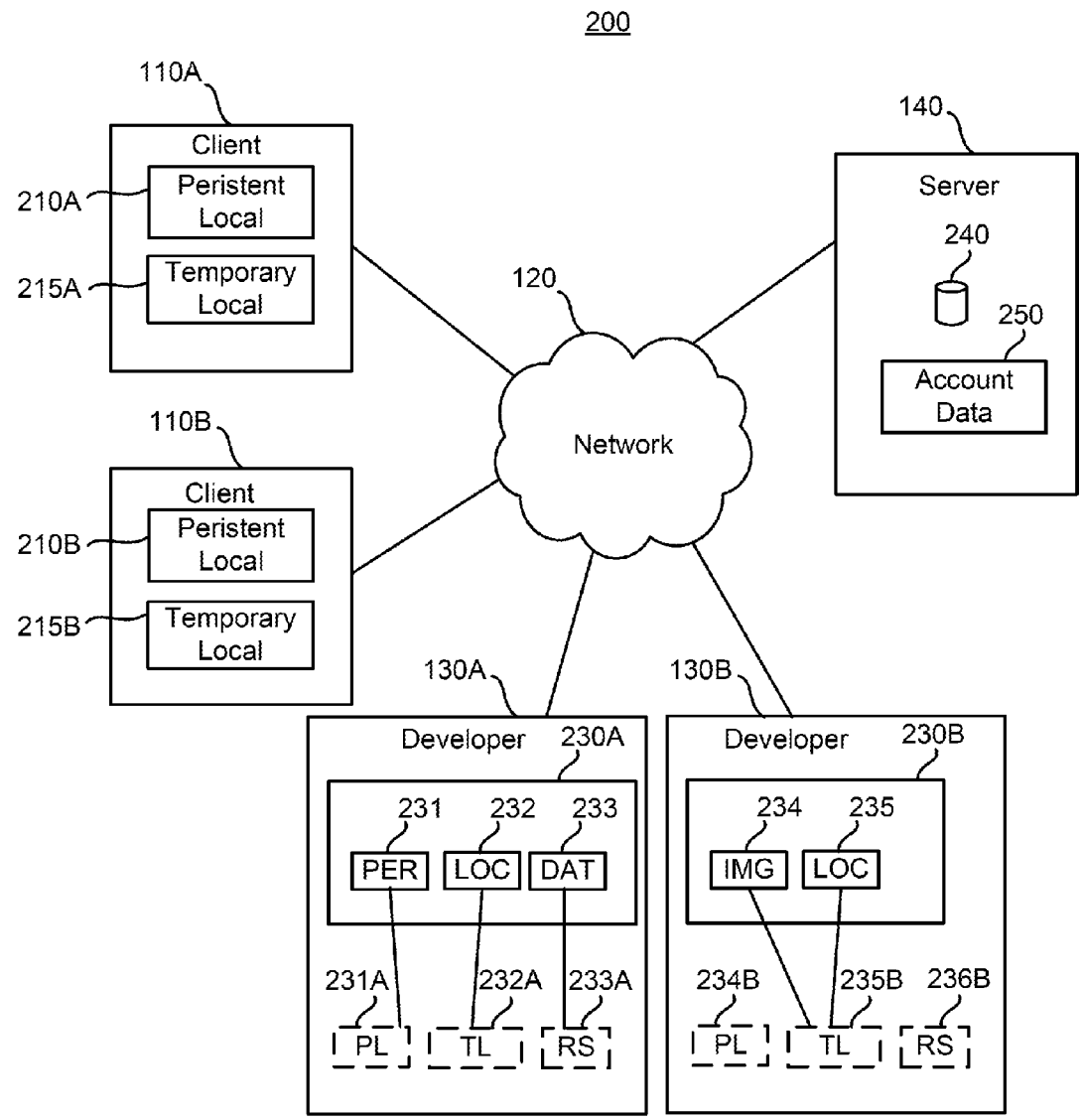
FIG. 2 is a block diagram of an exemplary system that can be used to allocate data storage for features of web applications and browser extensions.

Features and data for installed web applications may be synced across different computing devices, and local data, such as location data for a computing device, may also be synced. Developers may designate different tiers of data storage for different features of web applications and browser extensions. FIG. 2 is a block diagram of an exemplary system that can be used to allocate data storage for features of web applications and browser extensions. As shown in FIG. 2, clients 110A and 110B include persistent local storage 210A and 210B, and temporary local storage 215A and 215B. A web browser on client 110A or 110B may provide access to and communicate (e.g., using HTML5 web storage) with persistent local storage 210A and 210B, or temporary local storage 215A and 215B, to store information. Examples of persistent and temporary local storage are discussed in more detail below with respect to FIG. 3.

Server 140 may sync user accounts over network 120 using user identifiers or other login credentials. As an example, a single user may access a web application (e.g., one of applications 230A or 230B) from client computing device 110A, for example using a web browser, and at another time may access the same application from client computing device 110B. Server 140 may validate the user's login credentials (e.g., via the web browser) to allow the user to access the application (e.g., a hosted web application) from the different computing devices.

When a packaged web application has been installed, computing device 110A may locally store some data related to the packaged web application (e.g., in persistent local storage 210A, or temporary local storage 215A). Server 140 may also store some data related to the packaged web application (e.g., in database 240). In some implementations, server 140 may ensure that local data from computing device 110A is synced across all of a user's devices or all devices that are used to log the user into a user account (e.g., client computing device 110B). Additionally, passwords may be stored locally, but can be synced across devices using server 140. Further, sync server may sync across different devices any or all installed web applications, browser extensions, browser bookmarks, settings, profiles, browser history, themes, plugins, local permissions, security features, and data associated with the web applications and browser extensions for a user. For example, if a user of computing device 110A accesses a user account (for example, via a web browser) from computing device 110B, server 140 may copy settings and data associated with web applications and browser extensions (for example, that the user has selected to sync) from the user account to computing device 110B. Changes to settings on one computing device may be automatically copied (e.g., via server 140) from other computers (for example, if the user has enabled that sync feature). Synced data may be encrypted when it travels between computing devices 110A, 110B, and server 140 to keep information secure. Further, passwords may be encrypted on computing devices 110A, 110B, and server 140 using a cryptographic key.

Certain features of web applications may be stored in different locations or tiers of data storage. Tiers of data storage may allow for more efficient processing, and may allow users to sync only those features or data that the user or a developer allows to sync. As an example, a web application may store a user's location locally on a desktop computer in persistent local memory, so that each time a user runs a weather-related web application on the desktop computer, the web application does not have to update the location of the user. Yet, if the user runs the same weather-related web application from another device (e.g., a smart phone), the weather-related web application may need to update the location data to reflect a change in the user's location (for example, if the user drives to another city). In that example, the weather-related web application may store (potentially different) location data in a persistent local storage medium on each device.

As another example, a user may wish to have her e-mail messages and calendars accessible from any computing device she uses. In this example, web applications that utilize the user's e-mail and calendar data may be stored both locally and at a remote server. Developers can specify where data for certain features of web applications or browser extensions are stored, and various tiers of data storage may be used.

Developers 130A and 130B may create software applications 230A and 230B, which may be web applications or browser extensions, for example. Applications 230A and 230B may be stored at a developer computing device 130A, 130B, and may also be stored at server 140 and/or installed at clients 110A and 110B.

In some implementations, if a user has installed web application 230A, a web browser executing on client device 110A or 110B may provide access to tiers of data storage, and may receive a storage request from web application 230A when the web application is installed or launched, for example. The storage request may include a type specifying at least one tier of data storage related to at least one feature of the web application or browser extension (e.g., one of features 231, 232, 233, discussed in more detail below). For example, the type may specify persistent local storage 210A, temporary local storage 215A, or remote server database 240. The web browser may associate at least one feature of the application with at least one of the tiers of data storage. A table showing examples of tiers of data is illustrated below in Table 1.

TABLE 1

| Tier | Tier of Data Storage |
| --- | --- |
| Tier 1 | Remote server 140 |
| Tier 2 | Persistent local storage 210A |
| Tier 3 | Temporary local storage 215A |

The type of specified location for data storage for the feature(s) may be designated by a developer of application 230A, or by a user. In some implementations, the type of storage location(s) may be editable and modifiable. For example, a user may modify the type of storage for images for a social-media application to store all photo images for the application in temporary local storage 215A (e.g., a cache), to save space and to execute the application faster. As another example, a user may modify a setting in a financial tracking application to save certain financial data on a remote server as a backup (e.g., Tier 1, server 140), where a default setting established by a developer of that application specified that all financial data is stored in persistent local memory (e.g., Tier 2, 210A), for example for security reasons. As yet another example, a developer may indicate that a news-related application stores personal preferences (e.g., settings for which sections of the news are displayed) in persistent local memory (e.g., Tier 2, 210A), yet the news-related application may also store general news data (e.g., news updates, stories, images) in persistent storage in on a remote server (e.g., Tier 1, database 240). A table showing examples of associations between features of applications and tiers of data storage is shown below in Table 2.

TABLE 2

| Application | Feature | Tier of Data Storage |
| --- | --- | --- |
| Social Media App | Images | Tier 3 |
| Financial App | Financial Data | Tier 1 |
| News App | Preferences | Tier 2 |
| News App | News Feed | Tier 1 |

In the implementation shown in FIG. 2, application 230A includes at least three features: personal (PER) 231, location (LOC) 232, and data (DAT) 233. Each feature includes a designation specifying where data for that feature is stored. In the implementation shown in FIG. 2, at least three levels of data storage (i.e., tiers) are possible: persistent local PL 231A, temporary local (TL) 232A, or remote server (RS) 233A. PL 231A indicates that data for the corresponding feature should be stored in persistent local storage (for example, 210A or 210B). TL 232A indicates that data for the corresponding feature should be stored in temporary local storage (e.g., 215A or 215B). RS 233A indicates that data for the corresponding feature should be stored in a remote server (e.g., database 240 at server 140).

In the example shown in FIG. 2, personal preferences data PER 231 is designated by developer 130A to be stored in persistent local storage (PL 231A). Location data (LOC 232), for example location sensor information related to a mobile device implementing web application 230A, is designated by developer 130A to be stored in temporary local storage (TL 232A). Other data (DAT 233) related to the web application 230A is designated by developer 130A to be stored at remote server storage (RS 233A). In some implementations, at least some of the designations 231A, 232A, 233A may be editable and modifiable by developers or users of the web applications or browser extensions.

Different applications may include different designations for one or more features, and certain features may be stored in the same type of storage. For example, as shown in FIG. 2, application 230B includes at least two features, images (IMG) 234 and location (LOC) 235. Images (IMG 234), which may be images viewed by a user using a social-media web application 230B, are designated by developer 130B to be stored in temporary local storage (TL 235B). Location data (LOC 235), for example location sensor data gathered by web application 230B, is also designated by developer 130B to be stored in temporary local storage (TL 235B).

In addition, server 140 may include a database 240 to store data for various web browser applications and extensions (e.g., data designated to be stored in remote server RS 233A for application 230A). Database 240 may be stored in non-volatile persistent storage at server 240. Examples of non-volatile persistent storage include ROM, flash memory, hard disks, or magnetic or optical discs.

Each web application and browser extension may have access to a designated or limited portion of database 240. Portions of database 240 may be associated with a quota, e.g., different size characteristics, and each web application, browser extension, feature, or developer may have access to designated portions of database 240 with different sizes. Server 140 may also include account data 250, which may store data related to user accounts, including user identifiers, passwords, profiles, preferences, settings, bookmarks, themes, security features, information related to web applications or browser extensions associated with each user account, and other account data. Account data 250 may be stored in non-volatile persistent storage at server 140. In some implementations, account data 250 and database 240 may be combined.

System 200 may implement any number of combinations of servers, data storage, web applications, browser extensions, features, and designated storage areas, and the particular depiction of clients, developers, web applications, features, and storage designations shown in FIG. 2 are merely for illustration and may be modified. For example, server 140 may use more than one database 240, and account data 250 may be stored remotely at another server. As another example, web application 230B may include more than two features, some of which may designate data for storage at server 240.

Figure 3:
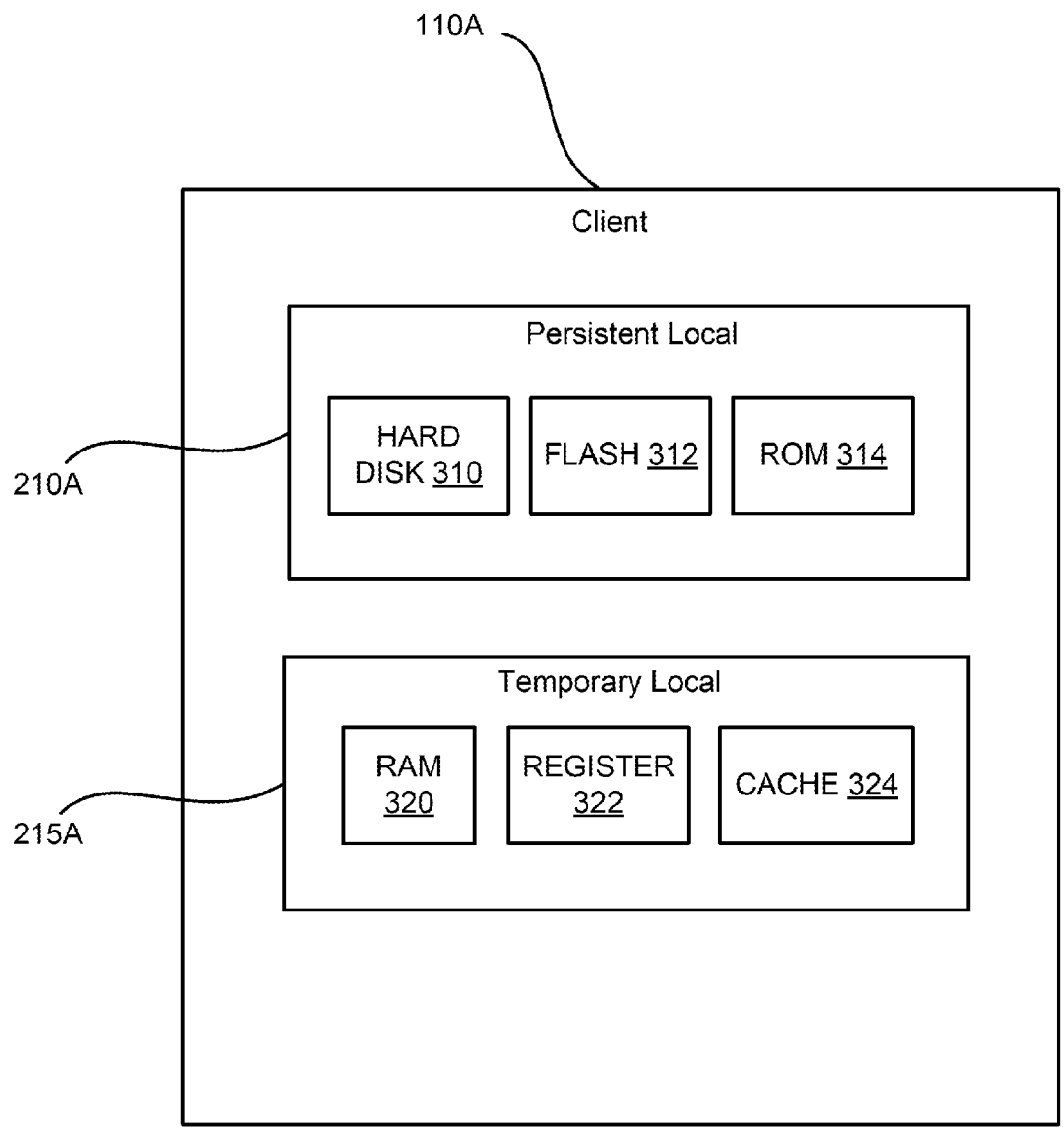
FIG. 3 is a block diagram of a client device that can be used to provide data storage for features of web applications and browser extensions.

FIG. 3 is a block diagram of a client device 110A that can be used to provide data storage for features of web applications and browser extensions. As shown in FIG. 3, client device 110 includes persistent local storage 210A and temporary local storage 215A. Persistent local storage 210A may include one or more of hard disk 310, flash memory 312, read-only memory (314), or other non-volatile local memory. Temporary local storage 215A may include one or more of random-access memory (RAM) 320, register 322, cache 324, or other volatile local memory. Various embodiments of persistent local storage 210A and temporary local storage 215A are described in more detail below with respect to FIG. 5. The embodiment shown in FIG. 3 is merely for illustration.

Figure 4:
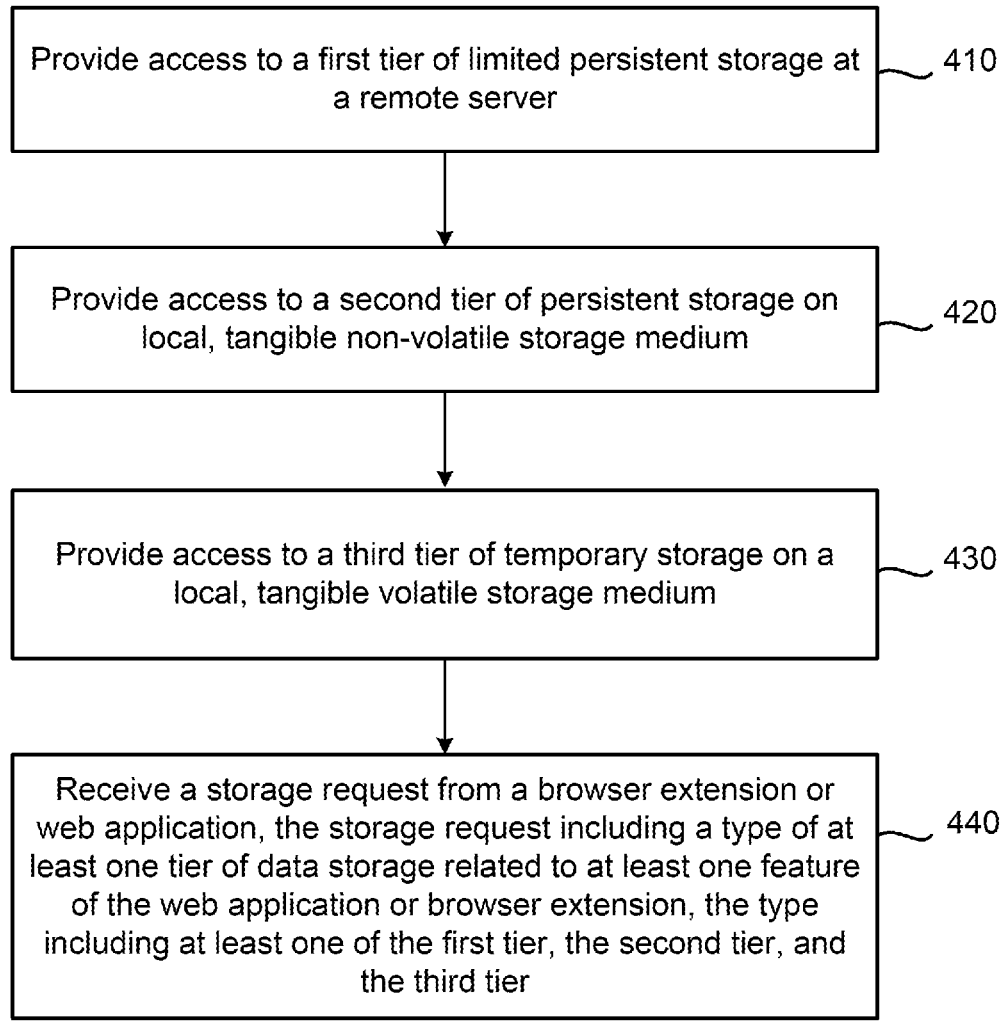
FIG. 4 is a flowchart of a process for providing data storage.

FIG. 4 is a flowchart of a process for providing data storage. The process may be performed at least in part by system 200 as shown in FIG. 2, including at least in part by a web browser on client 110A. The system provides access to a first tier of limited persistent storage at a remote server (e.g., database 240 of server 140) (step 410). A first set of data from the first tier may be synchronized across multiple devices associated with a user account. The system provides access to a second tier of persistent storage on a local, tangible non-volatile storage medium (e.g., persistent local storage 210A shown in FIGS. 2-3) (step 420). The system provides access to a third tier of temporary storage on a local, tangible volatile storage medium (e.g., temporary local storage 215A shown in FIGS. 2-3) (step 430).

A web browser receives a storage request from a browser extension or web application, the storage request including a type of at least one tier of data storage related to at least one feature of the web application or browser extension, the type including at least one of the first tier, the second tier, and the third tier (step 440). In some implementations, the feature of the web application or browser extension is associated with at least one tier of data storage, for example by the web browser. For example, as shown in Table 2, an image feature of a social media application may be associated with the first tier of data storage (e.g., server 140). As another example, a financial data feature of a financial application may be associated with a second tier of data storage (e.g., persistent local storage 210A). The examples of tiers, associations, features, and applications discussed with respect to FIGS. 1-4 are merely for illustration and may be added to, changed, or reconfigured. For example, in some implementations, all bookmarks for all web applications may be automatically associated with a specified tier, such as Tier 2, and preferences for certain types of users may be automatically associated with another specified tier, such as Tier 3, for example.

Figure 5:
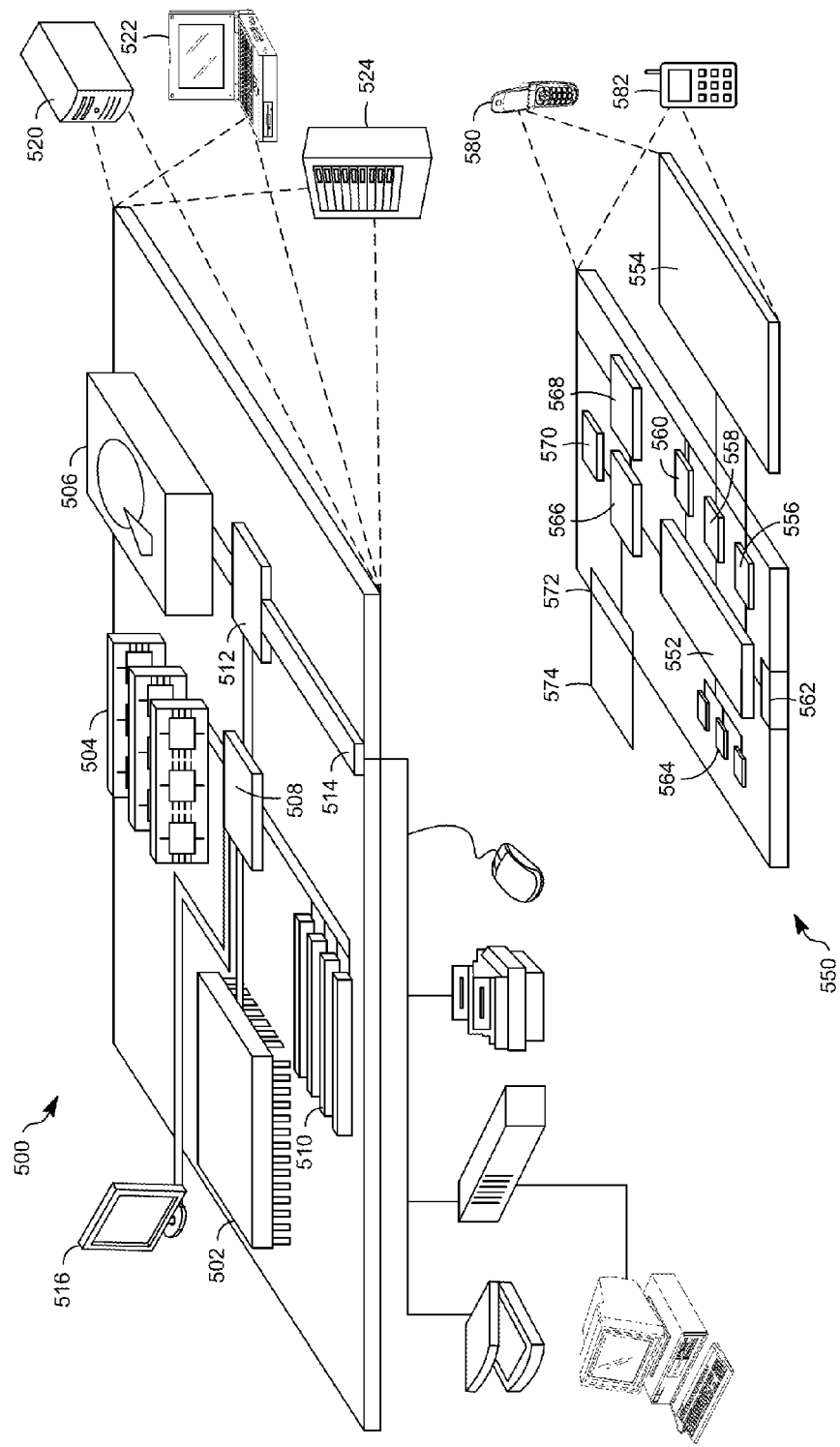
FIG. 5 illustrates an example of a computing device and a mobile computing device that can be used to implement the techniques described here.

FIG. 5 illustrates an example of a computing device and a mobile computing device that can be used to implement the techniques described here. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. In some implementations, the memory includes a combination of volatile and non-volatile memory units, for example as described above with respect to FIG. 3. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, or memory on processor 502.

The high speed controller 508 manages bandwidth-intensive operations for the computing device 500, while the low speed controller 512 manages lower bandwidth-intensive operations. Such allocation of functions is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT LCD (Thin-Film-Transistor Liquid Crystal Display) or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provided in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provided as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552, which may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning System) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smart phone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A method for providing data storage for features of a web application or a browser extension, wherein the web application or browser extension is executed by a web browser executing on one or more processors of a client computing device operably coupled to one or more memory devices of the client computing device, the method comprising:
    providing access to a first tier of limited persistent storage at a remote server, wherein a first set of data from the first tier is synchronized across multiple client computing devices associated with a user account;
    providing access to a second tier of persistent storage on a local, tangible non-volatile storage medium of the client computing device;
    providing access to a third tier of temporary storage on a local, tangible volatile storage medium of the client computing device;
    receiving, by the web browser, a first storage request from the web application or browser extension, the first storage request including data of a first type that is associated with a first feature of the web application or browser extension, the first storage request further including a first tier designation indicating one of the first tier, the second tier and the third tier to be used to store the data of the first type;
    storing the data of the first type in accordance with the first tier designation;
    receiving, by the web browser, a second storage request from the web application or browser extension, the second storage request including data of a second type that is associated with a second feature of the web application or browser extension, the second storage request further including a second tier designation indicating one of the first tier, the second tier and the third tier to be used to store the data of the second type, the second tier designation being different than the first tier designation; and
    storing the data of the second type in accordance with the second tier designation.

2. The method of claim 1, wherein the first tier of limited persistent storage at the remote server includes a portion of data associated with the user account.

3. The method of claim 2, wherein the data associated with the user account includes bookmarks, preferences, passwords, and themes.

4. The method of claim 1, wherein the first set of data is synchronized across multiple devices based on a request from the web application executed by the web browser on the client computing device.

5. The method of claim 1, wherein the feature implements a location detection sensor of the client computing device, and wherein the type includes the second tier.

6. The method of claim 1, wherein the feature is associated with an email account associated with the user account, and wherein the type includes the first tier.

7. The method of claim 1, wherein the feature relates to a calendar associated with the user account, and wherein the type includes the first tier.

8. A method for allocating data for features of a web application, wherein the web application is executed by a web browser executing on one or more processors operably coupled to one or more memory devices of a computing device, the method comprising:
    executing a feature of a web application on the computing device;
    automatically determining, based on the feature, a designation of a tier of data storage from a set of specified tiers of data storage to use to store data associated with the feature of the web application; and
    sending, from the web application, a storage request for a set of data associated with the feature of the web application to the designated tier of data storage from the set of specified tiers of data storage, the set of specified tiers of data storage including:
        a first tier of limited persistent storage at a remote server, wherein a first set of data from the first tier is synchronized across multiple devices associated with a user account,
        a second tier of persistent storage on local non-volatile storage on the computing device, and
        a third tier of temporary storage of local volatile storage on the computing device.

9. The method of claim 8, wherein the feature relates to a location detection sensor of the computing device, and the designated tier of data storage from the set of specified tiers of data storage is the third tier.

10. The method of claim 8, wherein the designated tier of data storage from the set of specified tiers of data storage is specified by a developer of the web application.

11. The method of claim 8, further comprising:
implementing the web application on a second computing device associated with the user account; and
accessing the first set of data using the user account.

12. A tangible computer-readable storage medium having recorded and stored thereon instructions that, when executed by one or more processors of a computer system cause the computer system to:
implement a feature of a web application on the computing system, the web application executed by a web browser and being associated with a user account;
automatically determine, based on the feature, a designation of a tier of data storage from a set of specified tiers of data storage; and
send, from the web application, a storage request for a set of data related to the feature to the designated tier of data storage from the set of specified tiers of data storage, the set of specified tiers of data storage including:
a first tier of limited persistent storage at a remote server, wherein a first set of data from the first tier is synchronized across multiple devices associated with the user account,
a second tier of persistent storage on local non-volatile storage on the computing system, and
a third tier of temporary storage of local volatile storage on the computing system.

13. The tangible computer-readable storage medium of claim 12, wherein the feature relates to a location detection sensor of the computer system, and the designated tier of data storage is the third tier.

14. The tangible computer-readable storage medium of claim 12, wherein the designated tier of data storage from the set of specified tiers of data storage is specified by a developer of the web application.

15. A system to provide data storage for features of a web application associated with a user account, the system comprising:
a remote server including a first tier of remote limited persistent storage, wherein a first set of data from the first tier is synchronized across multiple devices associated with a user account; and
a client device including:
a memory configured to store executable code and configured to store data associated with the web application, the memory including a second tier of local persistent storage on local non-volatile storage and a third tier of local temporary storage on local volatile storage; and
a processor operably coupled to the memory, the processor being configured to execute code such that the client device:
receives a storage request from the web application associated with the user account, the storage request including data that is associated with a feature of the web application, the storage request further including a tier designation to be used to store the data that is associated with the feature of the web application, the tier designation corresponding with one of the first tier of remote limited persistent storage, the second tier of local persistent storage, or the third tier of local temporary storage; and
storing the data associated with the feature of the web application in accordance with the tier designation.

16. The system of claim 15, wherein the first tier of limited persistent storage at the remote server includes a portion of data associated with the user account.

17. The system of claim 16, wherein the data associated with the user account includes bookmarks, preferences, passwords, and themes.

18. The system of claim 15, wherein the data that is associated with the feature of the web application is synchronized across multiple devices based on a request from the web application executed by a browser on the client device.

19. The system of claim 15, wherein the feature of the web application implements a location detection sensor of the client device, and wherein the tier designation corresponds with the second tier.

20. The system of claim 15, wherein the feature of the web application relates to an email account associated with the user account, and wherein the tier designation corresponds with the first tier.

21. The system of claim 15, wherein the feature of the web application relates to a calendar associated with the user account, and wherein the tier designation corresponds with the first tier.

22. The method of claim 1, wherein the first tier designation is provided by a developer of the web application.

23. The system of claim 15, wherein the tier designation is provided by a developer of the web application.

* * * * *